(12) United States Patent
Nishiura et al.

(10) Patent No.: US 9,422,410 B2
(45) Date of Patent: Aug. 23, 2016

(54) FLAME-RETARDANT FOAMED STYRENE RESIN COMPOSITION

(71) Applicant: DAI-ICHI KOGYO SEIYAKU CO., LTD., Kyoto-shi, Kyoto (JP)

(72) Inventors: Masahito Nishiura, Kyoto (JP); Hideaki Onishi, Kyoto (JP); Hisanori Semori, Kyoto (JP); Naomi Toyoshima, Kyoto (JP)

(73) Assignee: DAI-ICHI KOGYO SEIYAKU CO., LTD., Kyoto-shi, Kyoto (JP)

( * ) Notice: Subject to any disclaimer, the term of this patent is extended or adjusted under 35 U.S.C. 154(b) by 0 days.

(21) Appl. No.: 14/653,366

(22) PCT Filed: Dec. 13, 2013

(86) PCT No.: PCT/JP2013/083469
§ 371 (c)(1),
(2) Date: Jun. 18, 2015

(87) PCT Pub. No.: WO2014/097987
PCT Pub. Date: Jun. 26, 2014

(65) Prior Publication Data
US 2015/0344658 A1    Dec. 3, 2015

(30) Foreign Application Priority Data
Dec. 19, 2012    (JP) ................. 2012-277419

(51) Int. Cl.
| | |
|---|---|
| C08J 9/00 | (2006.01) |
| C08J 9/04 | (2006.01) |
| C08K 3/16 | (2006.01) |
| C08J 9/14 | (2006.01) |
| C08K 3/22 | (2006.01) |
| C08K 5/06 | (2006.01) |
| C08K 5/3492 | (2006.01) |
| C08K 3/26 | (2006.01) |
| C08K 3/34 | (2006.01) |
| C08K 5/136 | (2006.01) |

(52) U.S. Cl.
CPC ............. *C08J 9/142* (2013.01); *C08J 9/0019* (2013.01); *C08J 9/0023* (2013.01); *C08J 9/0028* (2013.01); *C08J 9/0066* (2013.01); *C08J 9/0095* (2013.01); *C08J 9/04* (2013.01); *C08J 9/141* (2013.01); *C08K 3/22* (2013.01); *C08K 3/26* (2013.01); *C08K 3/34* (2013.01); *C08K 5/06* (2013.01); *C08K 5/136* (2013.01); *C08K 5/34924* (2013.01); *C08J 2201/03* (2013.01); *C08J 2205/00* (2013.01); *C08J 2325/06* (2013.01); *C08K 2003/2296* (2013.01)

(58) Field of Classification Search
None
See application file for complete search history.

(56) References Cited

U.S. PATENT DOCUMENTS

| | | | | |
|---|---|---|---|---|
| 2007/0018143 A1* | 1/2007 | Goossens | ............. | C08K 3/0058 252/609 |
| 2011/0319507 A1* | 12/2011 | Onishi | ................... | C08J 9/0019 521/60 |

FOREIGN PATENT DOCUMENTS

| | | |
|---|---|---|
| JP | 4-268354 A | 9/1992 |
| JP | 9-255833 A | 9/1997 |
| JP | 2004-161868 A | 6/2004 |
| JP | 2008-542522 A | 11/2008 |
| JP | 2012-107227 A | 6/2012 |

OTHER PUBLICATIONS

International Search Report dated Mar. 11, 2014 issued in corresponding PCT/JP2013/083469 application (pp. 1-4).

* cited by examiner

*Primary Examiner* — Kara Boyle
(74) *Attorney, Agent, or Firm* — Millen White Zelano and Branigan, PC; John Sopp; Anthony Zelano

(57) ABSTRACT

Provided is a recyclable flame-retardant foamed styrene resin composition having high flame-retardancy and heat stability by adding little bromine-containing flame retardant. A flame-retardant foamed styrene resin composition containing (A) a styrene resin, (B) a mixture of (B1) tetrabromobisphenol A-bis(2,3-dibromo-2-methylpropyl ether) and (B2) another bromine-containing flame retardant, (C) zinc-modified hydrotalcite, (D) zeolite, and (G) a foaming agent, containing 0.005-0.08 parts by weight of (C) the zinc-modified hydrotalcite per 100 parts by weight of (A) the styrene resin.

7 Claims, No Drawings

FLAME-RETARDANT FOAMED STYRENE RESIN COMPOSITION

TECHNICAL FIELD

The present invention relates to a flame-retardant foamable styrene-based resin composition that is to be molded into a foamed article by melting it in an extruder, compressing a foaming agent into the melt, and then extruding the melt.

BACKGROUND ART

Styrene-based resin foamed articles, which are lightweight, have been used in a variety of applications including heat insulation applications for household electrical appliances, building materials, etc. and civil engineering applications such as an embankment method.

A styrene-based resin is made up of only carbon and hydrogen, and has a property of burning vigorously with evolution of black smoke once ignited. For this reason, it is imperative in some application fields to flameproof the resin by the addition of a flame retardant. For example, extrusion-foamed polystyrene molded articles to be used as a heat insulating material must pass a combustion test of JIS A 9511. Moreover, synthetic resin foamed articles having an oxygen index of less than 26.0 are designated as designated combustibles by the Fire Service Act, and storage, conveyance and transfer of a foamed article larger than 20 $m^3$ are highly regulated and therefore such articles are not practically marketable.

Hexabromocyclododecane (HBCD), by which a desired flame retarding effect is attained at a relatively small addition amount, has heretofore been used for flameproofing of styrene-based resin foamed articles produced by an extrusion method. However, HBCD is poor in heat stability, and a decomposition product (HBr) generated when a resin composition containing HBCD is heated to the melting temperature causes deterioration in quality, such as coloring of the resin, and poses a problem of promoting corrosion of an apparatus. Moreover, although it is desirable that foamed articles and scraps generated during their production are recycled for the production of new foamed articles, a flame retardant being low in heat stability like HBCD promotes coloring and depolymerization of the resin during melting, and degrades the resin to be unsuitable for recycling.

Use of other bromine-based flame retardants instead of HBCD for styrene-based resin extrusion-foamed articles has been proposed, and one of such flame retardants is tetrabromobisphenol A-bis(2,3-dibromo-2-methylpropyl ether). This has a flame retarding effect comparable to that of HBCD, but is low in heat stability. Accordingly, it has been proposed by the present applicant to replace part of (B1) tetrabromobisphenol A-bis(2,3-dibromo-2-methylpropyl ether) with (B2) tetrabromobisphenol A-bis(2,3-dibromopropyl ether) or tris(2,3-dibromopropyl) isocyanurate in order to attain flame retardancy represented by an oxygen index of 26.0 or more, thereby preventing degradation of the resin typified by decrease in molecular weight in comparison with the case of using (B1) alone. Use of the above-mentioned flame retardant mixture for extrusion-foamed articles of styrene-based resins has been proposed also in other patent documents.

PRIOR ART DOCUMENTS

Patent Documents

Patent Document 1: JP-A-2010-275528
Patent Document 2: JP-A-2012-107227
Patent Document 3: JP-A-2012-136674
Patent Document 4: JP-A-2012-136675

DISCLOSURE OF THE INVENTION

Problems to be Solved by the Invention

Although a foamed article having flame retardancy comparable to that attained by (B1) alone and having improved heat stability can be obtained in the same addition amount by use of the above-mentioned flame retardant in combination for flameproofing of a styrene-based resin extrusion-foamed article, it is desired to further improve heat stability against problems typified by coloring and decrease in molecular weight. Moreover, there is also desired research of a flame retardant that is used in combination with the flame retardant (B1), and that is capable of successfully attaining, in the same level of addition amount as in the case of the flame retardant (B1) alone, a comparable flame retarding effect, and further improving stability. The present invention seeks to satisfy these requests.

Solutions to the Problems

In order to solve the above-described problems, the present invention provides a flame-retardant foamable styrene-based resin composition containing (A) a styrene-based resin, (B) a mixture of (B1) tetrabromobisphenol A-bis(2,3-dibromo-2-methylpropyl ether) and (B2) a different bromine-containing flame retardant, (C) zinc-modified hydrotalcite, (D) zeolite, and (G) a foaming agent, wherein 0.005 to 0.08 parts by weight of the zinc-modified hydrotalcite (C) is contained per 100 parts by weight of the styrene-based resin (A).

Preferred specific examples of the bromine-containing flame retardant other than (B1) include tetrabromobisphenol A-bis(2,3-dibromopropyl ether), tris(2,3-dibromopropyl) isocyanurate, tetrabromobisphenol S-bis(2,3-dibromopropyl ether), tetrabromobisphenol F-bis(2,3-dibromopropyl ether), tetrabromobisphenol A, hexabromobenzene, pentabromotoluene, polybromodiphenyl ether, polybromophenylethane, bispolybromophenoxyethane, tris(tribromophenoxy)triazine, polybromophenoxyindan, polypentabromobenzyl acrylate, ethylenebistetrabromophthalimide, tris(tribromoneopentyl) phosphate, and brominated epoxy resin oligomer.

The "zinc-modified hydrotalcite" as referred to in the present invention is a layered double hydroxide resulting from replacement of part of Mg of hydrotalcite $Mg_6Al_2(OH)_{16}(CO_3) \cdot 4H_2O$ with Zn and is represented by the formula $[Mg_aZn_bAl_x(OH)_2]^{x+}(A^{n-})_{x/n} \cdot mH_2O$, wherein $0.5 \le a+b<1.0$, $0<x \le 0.5$, $a+b=1-x$, m is a positive number, and A is an n-valent anion. Preferably, the anion is carbonate ion $CO_3^{2-}$.

Effects of the Invention

When added as a flame retardant for an extrusion-foamed article of a styrene-based resin, tetrabromobisphenol A-bis(2,3-dibromo-2-methylpropyl ether) (B1) and a different bromine-containing flame retardant (B2) in combination may not achieve a desired level of flame retardancy. Even in such a case, further addition of small amounts of zinc-modified hydrotalcite and zeolite can attain a desired level of flame retardancy and, at the same time, improves heat stability against problems typified by coloring of a foamed article and decrease in molecular weight of the resin to such an extent that recycling is not disrupted.

EMBODIMENTS OF THE INVENTION

Examples of the styrene-based resin (A) of the present invention include homopolymers of styrene, copolymers of styrene with o-methylstyrene, m-methylstyrene, p-methylstyrene, 2,4-dimethylstyrene, ethylstyrene, p-tert-butylstyrene, α-methylstyrene, α-methyl-p-methylstyrene, 1,1-diphenylethylene, p-(N,N-diethylaminoethyl)styrene, p-(N,N-diethylaminomethyl)styrene, or the like, and mixtures thereof. The styrene-based resin (A) is preferably one containing 50% by weight or more of a styrene monomer, and is typically polystyrene.

Moreover, a rubbery polymer may be blended with the styrene-based resin. Examples of the rubbery polymer include polybutadiene, polyisoprene, styrene-butadiene copolymer, styrene-isoprene copolymer, acrylonitrile-butadiene copolymer, styrene-isobutylene-butadiene copolymer, butadiene-(meth)acrylate copolymer, styrene-butadiene block copolymer, styrene-isoprene block copolymer, butyl rubber, ethylene-α-olefin copolymer (ethylene-propylene rubber), ethylene-α-olefin-polyene copolymer (ethylene-propylene-diene rubber), silicone rubber, acrylic rubber, and hydrogenated diene rubber (hydrogenated styrene-butadiene block copolymer and hydrogenated butadiene polymer). Such rubbery polymers may be used singly or in combination. The used amount thereof is preferably 30% by weight or less, more preferably 20% by weight or less in the monomer components.

In the present invention, a mixture of (B1) tetrabromobisphenol A-bis(2,3-dibromo-2-methylpropyl ether) and (B2) a different bromine-containing flame retardant (B2) is used as a flame retardant (B). Specific examples of the different bromine-containing flame retardant (B2) include tetrabromobisphenol A-bis(2,3-dibromopropyl ether), tris(2,3-dibromopropyl) isocyanurate, tetrabromobisphenol S-bis (2,3-dibromopropyl ether), tetrabromobisphenol F-bis(2,3-dibromopropyl ether), tetrabromobisphenol A, hexabromobenzene, pentabromotoluene, polybromodiphenyl ether, polybromodiphenylethane, bispolybromophenoxyethane, tris(tribromophenoxy)triazine, polybromophenylindan, polypentabromobenzyl acrylate, ethylenebistetrabromophthalimide, tris(tribromoneopentyl) phosphate, and brominated epoxy resin oligomer. It is also permitted to use the flame retardant (B2) in combination with a phosphate, such as triphenyl phosphate, tricresyl phosphate, or trixylenyl phosphate, silicone, a hydrated metal compound, such as magnesium hydroxide, or so on. Two or more flame retardants (B2) may be used in combination. As the flame retardant (B2), use of tetrabromobisphenol A-bis(2,3-dibromopropyl ether) or tris(2,3-dibromopropyl) isocyanurate is preferable.

The combined amount of the flame retardants (B1) and (B2) is 1 to 10 parts by weight, preferably 1 to 6 parts by weight per 100 parts by weight of the styrene-based resin. The ratio of the flame retardants (B1) and (B2) in the mixture is 3/97 to 60/40, preferably 10/90 to 40/60 on a weight basis; high flame retardancy and high heat stability can be attained by setting the ratio within such a range.

The most characteristic feature of the present invention is to add slight amounts of (C) zinc-modified hydrotalcite and (D) zeolite, that is, (C) zinc-modified hydrotalcite in an amount of 0.005 to 0.08 parts by weight, preferably 0.01 to 0.05 parts by weight per 100 parts by weight of the styrene-based resin (A), and (D) zeolite preferably in an amount of 0.005 to 1.0 part by weight, more preferably 0.01 to 0.5 parts by weight, even more preferably 0.01 to 0.2 parts by weight per 100 parts by weight of the styrene-based resin (A) when flameproofing a styrene-based resin extrusion-foamed article with a mixture of the flame retardants (B1) and (B2). It has been found that this improves the heat stability of a resin composition containing a mixture of the flame retardants (B1) and (B2) and, unexpectedly, also improves flame retardancy at the same addition amounts of the flame retardants (B1) and (B2) in comparison with the case where styrene-based resin extrusion-foamed articles not containing one or both of the zinc-modified hydrotalcite (C) and the zeolite (D). Until now, it has been known that zinc-modified hydrotalcite can be used as a heat stabilizer for a polyvinyl chloride resin, and that zeolite can be used as a foam regulator for foamed polystyrene, as a dispersing agent in the case where water is used as a foaming agent, or as a stabilizer for a bromine-based flame retardant such as HBCD. However, it has not been known that the flame retardancy of a foamable styrene-based resin composition containing a flame retardant (B1) is improved thereby.

Zinc-modified hydrotalcite is a layered double hydroxide represented by the formula

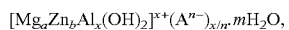

wherein 0.5≤a+b<1.0, 0<x≤0.5, a+b=1−x, m is a positive number, and A is an n-valent anion, typically carbonate ion $CO_3^{2-}$. As shown by the above formula, the positive charge of the metal double hydroxide base layer and the negative charge of the anion of the intermediate layer are balanced and, as a result, the entire compound is electrically neutral.

The zinc-modified hydrotalcite having the formula $Mg_3ZnAl_2(OH)_{12}CO_3 \cdot mH_2O$ is available from Kyowa Chemical Industry Co., Ltd. under the trade name of ZHT-4A, and the zinc-modified hydrotalcite having the formula $Mg_{3.5}Zn_{0.5}Al_2(OH)_{12}CO_3 \cdot 3H_2O$ is available from Sakai Chemical Industry Co., Ltd. under the trade name of STA-BIACE HT-7. Zinc-modified hydrotalcite differing in atomic ratios of Mg and Zn to Al from these commercially available products can be synthesized from a water-soluble salt of Mg, Zn and Al by a known method called a coprecipitation method.

As is well known, zeolite is a mineral having the rational formula $M_{2/n}O \cdot Al_2O_3 \cdot xSiO_2 \cdot yH_2O$, wherein M=Na, K, Ca, or Ba, n is the valence of M, x=2 to 10, and y=2 to 7. Although there are natural products, synthetic products, which are smaller in impurity content, stable in quality, and uniform in particle size, are preferable.

As to the zinc-modified hydrotalcite and the zeolite, ones treated with a surface treatment agent can be used for enabling their uniform dispersion in a styrene-based resin. Examples of such a surface treatment agent include higher fatty acids such as stearic acid, oleic acid, and lauric acid, higher fatty acid metal salts such as sodium stearate and sodium oleate, anionic surfactants such as sodium laurylbenzenesulfonate, silane coupling agents such as vinyltriethoxysilane and γ-methacryloylpropyltriethoxysilane, titanate coupling agents such as isopropyltriisostearoyl titanate and isopropyltridecylbenzenesulfonyl titanate, glycerin fatty acid esters such as glycerin monostearate and glycerin monooleate, higher fatty acid amides such as stearic acid amide, and waxes.

To the flame-retardant foamable styrene-based resin composition of the present invention may further be blended (E) a heat stabilizer. Blend of the heat stabilizer can further improve heat stability. Examples of such a heat stabilizer include phosphite compounds, thioether compounds, hindered phenol compounds, hindered amine compounds, organotin compounds, phosphates, and hydrotalcite.

Examples of the phosphite compounds include tris(2,4-di-tert-butylphenyl) phosphite, bis(2,4-di-tert-butylphenyl) pentaerythritol diphosphite, bis[2,4-bis(1,1-dimethylethyl)-6-methylphenyl]ethyl phosphite, tetrakis(2,4-di-tert-butylphenyl)[1,1-biphenyl]-4,4'-diyl bisphosphonite, bis(nonylphenyl)pentaerythritol diphosphite, bisstearylpentaerythritol diphosphite, bis(2,6-di-tert-butyl 4-methylphenyl)pentaerythritol diphosphite, 2,2'-methylenebis(4,6-di-tert-butyl-1-phenyloxy) (2-ethylhexyloxy)phosphorus, tetra(tridecyl)-4,4'-butylidene-bis(2-tert-butyl-5-methylphenyl) diphosphite, hexatridecyl-1,1,3-tris(3-tert-butyl-6-methyl-4-oxyphenyl)-3-methylpropane triphosphite, mono(dinonylphenyl)mono-p-nonylphenyl phosphite, tris(mononylphenyl) phosphite, tetra-(C12-C16)alkyl-4,4'-isopropylidene-(bisphenyl) diphosphite, mono- or diphenyl-mono- or di-alkyl (or (C8-C13)alkoxyalkyl) phosphite, diphenyl isodecyl phosphite, trisdecyl phosphite, and triphenyl phosphite.

Examples of the thioether compounds include dilauryl 3,3'-thiodipropionate, dimyristyl 3,3'-thiodipropionate, distearyl 3,3'-thiodipropionate, pentaerythritol tetrakis(3-laurylthiopropionate), di(tridecyl) 3,3'-thiodipropionate, and 2-mercaptobenzimidazole.

Examples of the hindered phenol compounds include 1,6-hexanediol-bis[3-(3,5-di-tert-butyl-4-hydroxyphenyl) propionate], triethylene glycol-bis[3-(3-tert-butyl-5-methyl-4-hydroxyphenyl) propionate], glycerin tris[3-(3,5-di-tert-butyl-4-hydroxyphenyl)-propionate], pentaerythritol tetrakis[3-(3,5-di-tert-butyl-4-hydroxyphenyl) propionate], octadecyl-3-(3,5-di-tert-butyl-4-hydroxyphenyl) propionate, thiodiethylenebis[3-(3,5-di-tert-butyl-4-hydroxyphenyl) propionate], N,N'-hexane-1,6-diylbis[3-(3,5-di-tert-butyl-4-hydroxyphenyl) propionamide], 2,4-dimethyl-6-(1-methylpentadecyl)phenol, diethyl [[3,5-bis(1,1-dimethylethyl)-4-hydroxyphenyl]methyl]phosphonate, calcium diethylbis[[3,5-bis(1,1-dimethylethyl)-4-hydroxyphenyl]methyl]phosphonate, 3,3',3'',5,5',5''-hexa-tert-butyl-a,a',a''-(mesitylene-2,4,6-triyl) tri-p-cresol, 4,6-bis(octylthiomethyl)-o-cresol, ethylenebis(oxyethylene)bis[3-(5-tert-butyl-4-hydroxy-m-tolyl) propionate], hexamethylenebis[3-(3,5-di-tert-butyl-4-hydroxyphenyl) propionate], 1,3,5-tris (3,5-di-tert-butyl-4-hydroxybenzyl)-1,3,5-triazine-2,4,6 (1H,3H,5H)-trione, 1,3,5-tris[(4-tert-butyl-3-hydroxy-2,6-xylyl)methyl]-1,3,5-triazine-2,4,6(1H,3 H,5H)-trione, and 2,6-di-tert-butyl-4-(4,6-bis(octylthio)-1,3,5-triazin-2-ylamino)phenol.

Examples of the hindered amine compounds include 4-benzoyloxy-2,2,6,6-tetramethylpiperidine, bis(2,2,6,6-tetramethyl-4-piperidinyl) sebacate, bis(1,2,2,6,6-pentamethyl-4-piperidinyl)sebacate, bis(1,2,2,6,6-pentamethyl-4-piperidinyl)-2-(3,5-di-tert-butyl-4-hydroxybenzyl)-2-n-butylmalonate, tetrakis(2,2,6,6-tetramethyl-4-piperidinyl-1,2,3,4-butanetetracarboxylate, and tetrakis(1,2,2,6,6-pentamethyl-4-piperidinyl)-1,2,3,4-butanetetracarboxylate.

Examples of the organotin compounds include dioctyltin dilaurate and dioctyltin maleate, and examples of the phosphates include triphenyl phosphate, tricresyl phosphate, and trixylenyl phosphate.

Hydrotalcite compounds having the formula $Mg_{1-x}Al_x(OH)_2 \cdot (CO_3)_{x/2} \cdot mH_2O$, wherein $0<x\leq0.5$, and m is a positive number, can also be added as a heat stabilizer. As one example, synthetic hydrotalcite having the formula $Mg_{4.3}Al_2(OH)_{12.6}CO_3 \cdot mH_2O$ is available from Kyowa Chemical Industry Co., Ltd. under the trade name of DHT-4A.

When using the heat stabilizer (E), the addition amount thereof is preferably 0.01 to 0.5 parts by weight per 100 parts by weight of the styrene-based resin (A).

The flame retardant effect of the bromine-based flame retardants is known to be enhanced with (F) a radical generator or a phthalocyanine metal complex. Examples of such a radical generator include cumene peroxide, cumene hydroperoxide, di-tert-butyl peroxide, di-tert-hexylperoxide, 2,5-dimethyl-2,5-di(tert-butylperoxy)hexyne-3, dicumyl peroxide, and 2,3-dimethyl-2,3-diphenylbutane, and examples of the phthalocyanine metal complex include phthalocyanine iron, phthalocyanine manganese, and phthalocyanine cobalt. Dicumyl peroxide, 2,3-dimethyl-2,3-diphenylbutane and phthalocyanine iron are preferable.

The flame-retardant foamable styrene-based resin composition of the present invention may be molded into foam-molded articles by an extrusion foaming process. In the extrusion foaming process, the bromine-based flame retardant (B) and other additives are melt-mixed with the styrene-based resin (A) in an extruder, and then a foaming agent (G) is compressed into the molten mixture, which is then extruded through the die of the extruder to the atmosphere, thereby the mixture is foam-molded.

Examples of the foaming agent (G) include volatile organic foaming agents such as propane, butane, isobutane, pentane, cyclopentane, hexane, cyclohexane, 1-chloro-1,1-difluoroethane, monochlorodifluoromethane, monochloro-1,2,2,2-tetrafluoroethane, 1,1-difluoroethane, 1,1,1,2-tetrafluoroethane, 1,1,3,3,3-pentafluoropropane, dichloromethane, 1,2-dichloroethane, dimethyl ether, diethyl ether, and ethyl methyl ether, inorganic foaming agents such as water, nitrogen, and carbon dioxide gas, and chemical foaming agents such as azo compounds. These foaming agents may be used singly or in combination. While the amount of the foaming agent may vary depending on the properties required for foamed articles and the forming process, and therefore is not limited, it is preferably 0.01 to 0.5 mol, more preferably 0.05 to 0.3 mol per 100 parts by weight of the polystyrene-based resin.

When producing the flame-retardant styrene-based resin foam-molded article of the present invention, a foam nucleating agent (H) may further be incorporated in addition to the foaming agent (G). Examples of such a foam nucleating agent include talc, bentonite, kaolin, mica, silica, clay, and diatomaceous earth. When a foam nucleating agent is used, the used amount thereof is preferably 0.01 to 20 parts by weight, more preferably 0.1 to 10 parts by weight per 100 parts by weight of the polystyrene-based resin.

The flame-retardant foamable styrene-based resin composition of the present invention may further incorporate known resin additives such as light stabilizers, UV absorbing agents, UV stabilizing agents, heavy metal deactivating agents, impact strength improving agents, colorants, lubricants, anti-dripping agents, crystal nucleating agents, antistatic agents, and compatibilizing agents as long as the effect of the present invention is not impaired.

EXAMPLES

The present invention will be described concretely below with reference to examples and comparative examples, but the present invention is not limited thereby.

The raw materials used in the examples and the comparative examples are as follows.

(A) Styrene-based resin
GP-PS; PSJ Polystyrene G9305 (produced by PS Japan Corporation)
(B) Bromine-containing flame retardant:
(B1) Tetrabromobisphenol A-bis(2,3-dibromo-2-methylpropyl ether); trade name PYROGUARD SR-130 (produced by Dai-Ichi Kogyo Seiyaku Co., Ltd.)
(B2-1) Tetrabromobisphenol A-bis(2,3-dibromopropyl ether); trade name PYROGUARD SR-720N (produced by Dai-Ichi Kogyo Seiyaku Co., Ltd.)
(B2-2) Tris(2,3-dibromopropyl) isocyanurate; trade name PYROGUARD SR-750 (produced by Dai-Ichi Kogyo Seiyaku Co., Ltd.)
(B2-3) Tris(tribromophenoxy)triazine; trade name PYROGUARD SR245 (produced by Dai-Ichi Kogyo Seiyaku Co., Ltd.)
(B2-4) Brominated epoxy oligomer; trade name YDB-406 (produced by Nippon Steel & Sumikin Chemical Co., Ltd.)
(B2-5) Hexabromocyclododecane; trade name PYROGUARD SR-103 (produced by Dai-Ichi Kogyo Seiyaku Co., Ltd.) (for comparative examples) (phosphate) Triphenyl phosphate; trade name TPP (produced by Daihachi Chemical Industry Co., Ltd.)
(C) Zinc-modified hydrotalcite
(C-1) $Mg_3ZnAl_2(OH)_{12}CO_3 \cdot mH_2O$; trade name ZHT-4A (produced by Kyowa Chemical Industry Co., Ltd.)
(C-2) $Mg_{3.5}Zn_{0.5}Al_2(OH)_{12}CO_3 \cdot 3H_2O$; trade name STABIACE HT-7 (produced by Sakai Chemical Industry Co., Ltd.)
(D) Zeolite
(D-1) Synthetic zeolite; trade name Zeorum A-3 (produced by TOSOH Corporation)
(D-2) Synthetic zeolite; trade name Zeorum A-4 (produced by TOSOH Corporation)
(D-3) Synthetic zeolite; trade name Zeorum A-5 (produced by TOSOH Corporation)
(D-4) synthetic zeolite; trade name Zeorum F-9 (produced by TOSOH Corporation)
(E) Heat stabilizer
(E-1) Bis(2,6-di-tert-butyl-4-methylphenyl)pentaerythritol diphosphate; trade name ADK STAB PEP-36 (produced by ADEKA Corporation)
(E-2) Synthetic hydrotalcite $Mg_{4.3}Al_2(OH)_{12.6}CO_3 \cdot mH_2O$; trade name DHT-4A (produced by Kyowa Chemical Industry Co., Ltd.)
(F) Flame retardancy enhancer
2,3-Dimethyl-2,3-diphenylbutane; NOFMER-BC-90 (produced by NOF Corporation)
(G) Foaming agent
(G-1) Isobutane
(G-2) Dimethyl ether
(H) Foam nucleating agent
Talc MS (produced by Nippon Talc Co., Ltd.)

<Method of Preparing Test Specimens>
(Extrusion-Foamed Article)

A twin-stage extruder including an extruder having a diameter of 65 mm and an extruder having a diameter of 90 mm in series was provided. All the raw materials shown in Tables 1 and 2 excluding a foaming agent were fed to the extruder having a diameter of 65 mm, heated to 200° C. to be melted, plasticized, and kneaded, so that a styrene-based composition was formed. Subsequently, a prescribed amount of a foaming agent was introduced under pressure through a separate line to the forward end of the 65-mm extruder (the side opposite to the die of the extruder having a diameter of 90 mm). Then, the resin temperature was cooled to 120° C. in the extruder having a diameter of 90 mm and the material was extruded to the atmosphere through a die lip having a rectangular cross section being 2.5 mm in thickness and 45 mm in width provided at an end of the extruder having a diameter of 90 mm. Thus, an extrusion-foamed article of a styrene-based resin having a rectangular parallelepiped shape was obtained.

Evaluation of the foam-molded article was performed by the following methods.

<Flame Retardancy>
Oxygen index was measured according to JIS K7201.
○: Oxygen index is 26 or more.
x: Oxygen index is less than 26.

<Decrease in Molecular Weight>
The molecular weight of a styrene-based resin before foaming and the molecular weight of a flame-retardant styrene-based resin foam-molded article were measured by GPC analysis, and then the decrease (%) in weight average molecular weight (Mw) between before and after the molding of the polystyrene-based resin was calculated.

<Heat Stability>
An extrusion-foamed article under the test was sliced with a cutter to form a board, which was subsequently compressed with a twin roll and then coarsely pulverized with a pulverizer. The coarsely pulverized material was fed into a Labo Plastomill, melt-kneaded at 200° C., and then immediately taken out and molded with a cooling press into a 3.2 mm-thick plate shape. The resulting plate-shaped article was heated with a hot press at 220° C. for 40 minutes and then cooled with a cooling press, thereby yielding a sample for a heat resistance test. Using a spectrophotometer SD 6000 manufactured by Nippon Denshoku Industries Co., Ltd., the ΔE of the sample for a heat resistance test based on a standard white plate was measured. A smaller ΔE indicates higher heat resistance.

The formulation of the resin compositions and the test results of examples and comparative examples are shown in Tables 1 and 2. The numerical values of the components in the tables are in part(s) by weight.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Styrene-based resin | A | 100 | 100 | 100 | 100 | 100 | 100 | 100 | 100 | 100 | 100 |
| Bromine-containing flame retardant | B1 | 0.6 | 0.3 | 1.2 | 1.8 | 0.15 | 0.6 | 1 | 2 | 0.6 | 1.5 |
| | B2-1 | 2.4 | | 1.8 | 1.2 | 2.85 | 2.4 | 4 | 6 | 3.4 | 3.5 |
| | B2-2 | | 2.7 | | | (Note) | | | | | |
| | B2-3 | | | 0.5 | | | | | | | |
| | B2-4 | | | | 0.3 | | | | | | |
| | B2-5 | | | | | | | | | | |
| Zinc-modified hydrotalcite | C-1 | 0.03 | | 0.05 | 0.01 | 0.03 | | | | 0.05 | |
| | C-2 | | 0.03 | | | | 0.03 | 0.08 | 0.08 | | 0.04 |

TABLE 1-continued

| | | Example | | | | | | | | | |
|---|---|---|---|---|---|---|---|---|---|---|---|
| | | 1 | 2 | 3 | 4 | 5 | 6 | 7 | 8 | 9 | 10 |
| Zeolite | D-1 | 0.03 | 0.03 | 0.05 | 0.01 | 0.03 | | 0.08 | 0.04 | | |
| | D-2 | | | | | | | | | 0.03 | |
| | D-3 | | | | | | | | | | 0.06 |
| | D-4 | | | | | | 0.03 | | | | |
| Heat stabilizer | E-1 | 0.05 | | 0.1 | 0.1 | 0.05 | 0.05 | 0.1 | 0.1 | | |
| | E-2 | | | | 0.01 | | | | | | |
| Flame retardancy enhancer | F | | | | | | | | | 0.1 | |
| Foaming agent | G-1 | 3 | 3 | 3 | 3 | 3 | 3 | 3 | 3 | 3 | 3 |
| | G-2 | 3 | 3 | 3 | 3 | 3 | 3 | 3 | 3 | 3 | 3 |
| Foam nucleating agent | H | 1 | 1 | 1 | 1 | 1 | 1 | 1 | 1 | 1 | 1 |
| Evaluation | Flame retardancy | ○ | ○ | ○ | ○ | ○ | ○ | ○ | ○ | ○ | ○ |
| | Decrease in molecular weight (%) | 3 | 2 | 5 | 5 | 3 | 4 | 3 | 5 | 4 | 5 |
| | Heat resistance, ΔE | 16 | 15 | 18 | 20 | 15 | 16 | 17 | 20 | 19 | 20 |

(Note)
Example 5 contains 1 part by weight of a phosphate in addition to the flame retardants B1 and B2-1.

TABLE 2

| | | Comparative Example | | | | | | | | |
|---|---|---|---|---|---|---|---|---|---|---|
| | | 1 | 2 | 3 | 4 | 5 | 6 | 7 | 8 | 9 |
| Styrene-based resin | A | 100 | 100 | 100 | 100 | 100 | 100 | 100 | 100 | 100 |
| Bromine-containing flame retardant | B1 | 0.6 | 0.6 | 0.6 | 0.6 | 0.6 | | | | |
| | B2-1 | 2.4 | 2.4 | 2.4 | 2.4 | 2.4 | 3 | | | |
| | B2-2 | | | | | | | 3 | | |
| | B2-3 | | | | | | | | | |
| | B2-4 | | | | | | | | 3 | |
| | B2-5 | | | | | | | | | 3 |
| Zinc-modified hydrotalcite | C-1 | | 0.03 | | | 0.03 | 0.03 | 0.03 | 0.03 | 0.03 |
| | C-2 | | | | | | | | | |
| Zeolite | D-1 | 0.03 | | | 0.03 | | 0.03 | 0.03 | 0.03 | 0.03 |
| | D-2 | | | | | | | | | |
| | D-3 | | | | | | | | | |
| | D-4 | | | | | | | | | |
| Heat stabilizer | E-1 | 0.05 | 0.05 | 0.05 | 0.05 | 0.05 | 0.05 | 0.05 | 0.05 | 0.05 |
| | E-2 | | | | 0.03 | 0.03 | | | | |
| Flame retardancy enhancer | F | | | | | | | | | |
| Foaming agent | G-1 | 3 | 3 | 3 | 3 | 3 | 3 | 3 | 3 | 3 |
| | G-2 | 3 | 3 | 3 | 3 | 3 | 3 | 3 | 3 | 3 |
| Foam nucleating agent | H | 1 | 1 | 1 | 1 | 1 | 1 | 1 | 1 | 1 |
| Evaluation | Flame retardancy | X | X | X | X | X | X | X | X | ○ |
| | Decrease in molecular weight (%) | 3 | 3 | 5 | 3 | 3 | 3 | 5 | 7 | 15 |
| | Heat resistance, ΔE | 15 | 15 | 18 | 16 | 15 | 14 | 18 | 20 | 30 |

As can be clearly understood from Table 1, while the extrusion-foamed articles of Examples 1 to 10 are satisfactory in any item of flame retardancy, decrease in molecular weight, and heat resistance, the extrusion-foamed articles of Comparative Examples 1 to 8 are not satisfactory in flame retardancy, and the foam-molded article of Comparative Example 9 satisfies flame retardancy but is remarkably low in heat stability.

The invention claimed is:

1. A flame-retardant foamable styrene-based resin composition comprising (A) a styrene-based resin, (B) a mixture of (B1) tetrabromobisphenol A-bis(2,3-dibromo-2-methylpropyl ether) and (B2) a different bromine-containing flame retardant, (C) zinc-modified hydrotalcite, (D) zeolite, and (G) a foaming agent, wherein 0.005 to 0.08 parts by weight of the zinc-modified hydrotalcite (C) is contained per 100 parts by weight of the styrene-based resin (A).

2. The flame-retardant foamable styrene-based resin composition according to claim 1, wherein the flame retardant (B2) is tetrabromobisphenol A-bis(2,3-dibromopropyl ether), tris(2,3-dibromopropyl) isocyanurate, tris(tribromophenoxy)triazine, or a brominated epoxy oligomer.

3. The flame-retardant foamable styrene-based resin composition according to claim 1, wherein the ratio of the flame retardant (B1) to the flame retardant (B2) in the flame-retardant mixture is 3/97 to 60/40 on a weight basis.

4. A foam-molded article obtained by extrusion foaming the flame-retardant foamable styrene-based resin composition according to claim 1.

5. The flame-retardant foamable styrene-based resin composition according to claim 2, wherein the ratio of the flame retardant (B1) to the flame retardant (B2) in the flame-retardant mixture is 3/97 to 60/40 on a weight basis.

6. A foam-molded article obtained by extrusion foaming the flame-retardant foamable styrene-based resin composition according to claim 2.

7. A foam-molded article obtained by extrusion foaming the flame-retardant foamable styrene-based resin composition according to claim 3.

* * * * *